United States Patent
Kunstmann et al.

(10) Patent No.: US 7,235,127 B2
(45) Date of Patent: Jun. 26, 2007

(54) REDUCTION- AND OXIDATION-STABLE IRON OXIDE BLACK PIGMENTS HAVING HIGH COLOUR STRENGTH FOR COLOURING PLASTICS AND BUILDING MATERIALS, THEIR PREPARATION AND THEIR USE

(75) Inventors: Herbert Kunstmann, Krefeld (DE); Udo Kräuter, Leverkusen (DE); Carsten Rosenhahn, Krefeld (DE); Hans-Josef Moringen, Krefeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 11/301,682

(22) Filed: Dec. 13, 2005

(65) Prior Publication Data
US 2006/0133991 A1    Jun. 22, 2006

(30) Foreign Application Priority Data
Dec. 14, 2004   (DE)   ............ 10 2004 060 044

(51) Int. Cl.
*C09C 1/24*   (2006.01)
(52) U.S. Cl. ............ 106/456; 106/31.9; 106/460; 106/712; 423/632; 423/633; 426/250; 524/431
(58) Field of Classification Search ............ 106/456, 106/31.9, 460; 423/632, 633; 426/250; 524/431
See application file for complete search history.

(56) References Cited

U.S. PATENT DOCUMENTS

| | | | |
|---|---|---|---|
| 4,082,905 A * | 4/1978 | Stephan et al. | 428/842.6 |
| 4,453,260 A | 6/1984 | Inagawa et al. | 375/116 |
| 4,701,221 A | 10/1987 | Brunn et al. | 106/304 |
| 4,919,727 A * | 4/1990 | Burow et al. | 106/456 |
| 4,921,542 A * | 5/1990 | Rademachers et al. | 106/456 |
| 4,966,641 A * | 10/1990 | Westerhaus et al. | 106/456 |
| 5,002,609 A * | 3/1991 | Rademachers et al. | 106/456 |
| 5,013,365 A * | 5/1991 | Rademachers et al. | 106/456 |
| 5,055,136 A * | 10/1991 | Wiese et al. | 106/456 |
| 5,718,755 A * | 2/1998 | Kohler et al. | 106/456 |
| 5,837,051 A * | 11/1998 | Krekel et al. | 106/456 |
| 6,302,952 B1 * | 10/2001 | Mobbs et al. | 106/456 |
| 6,530,987 B1 * | 3/2003 | Auer et al. | 106/456 |

FOREIGN PATENT DOCUMENTS

| | | |
|---|---|---|
| DE | 518929 | 2/1931 |
| DE | 2439351 A * | 3/1975 |
| GB | 1535889 | 12/1978 |

* cited by examiner

*Primary Examiner*—Anthony J. Green
(74) *Attorney, Agent, or Firm*—Norman B. Thot

(57) ABSTRACT

The present invention relates to reduction- and oxidation-stable iron oxide black pigments having high color strength, the preparation thereof and the use thereof.

10 Claims, 1 Drawing Sheet

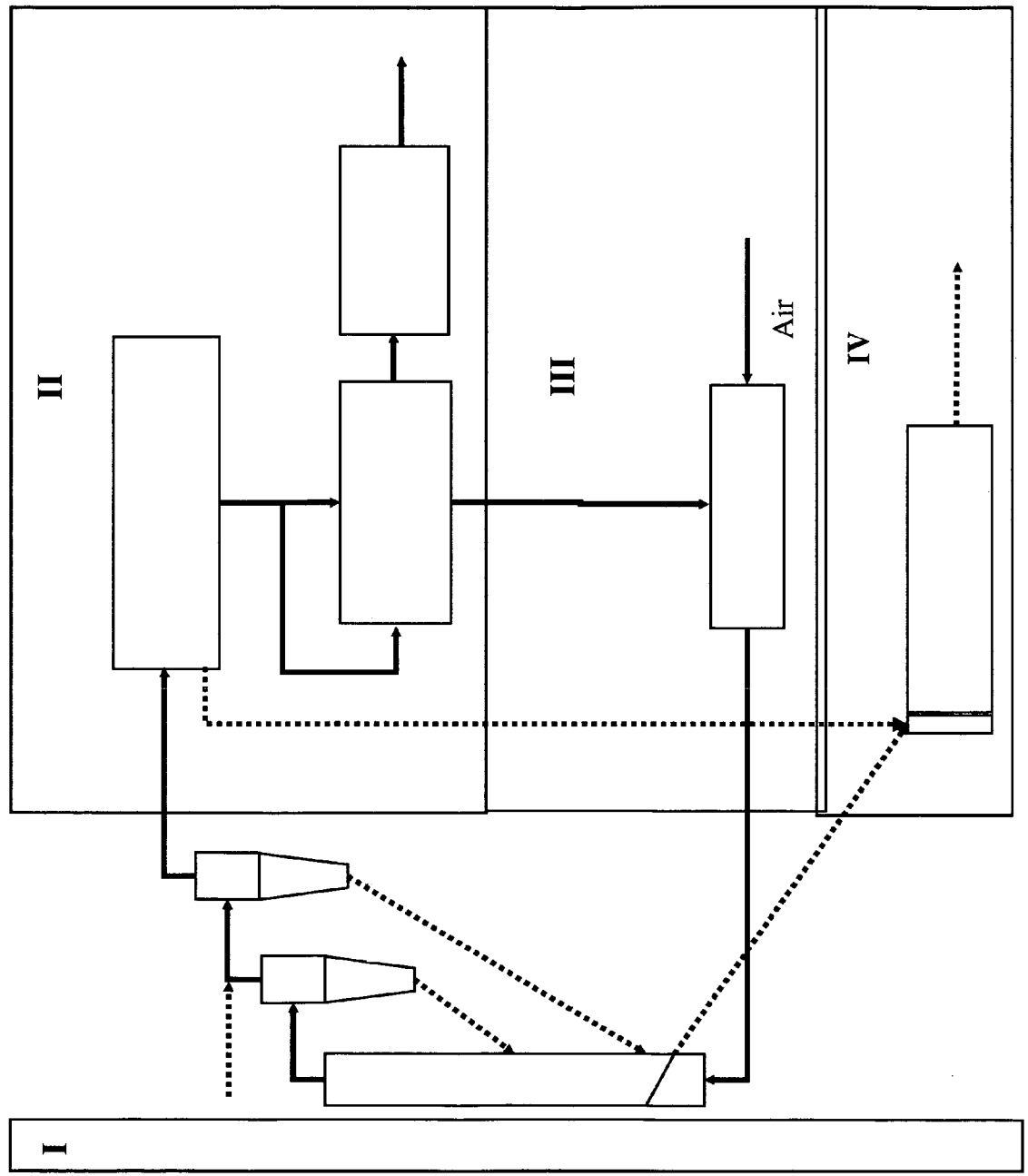
Fig. 1: Diagram showing the principle of the circulating fluidized-bed unit

REDUCTION- AND OXIDATION-STABLE IRON OXIDE BLACK PIGMENTS HAVING HIGH COLOUR STRENGTH FOR COLOURING PLASTICS AND BUILDING MATERIALS, THEIR PREPARATION AND THEIR USE

BACKGROUND OF THE INVENTION

The present invention relates to reduction- and oxidation-stable iron oxide black pigments having high colour strength, the preparation thereof and the use thereof.

Iron oxide black pigments consist of oxides of divalent and trivalent iron having the magnetite structure. They are prepared either by the one- or two-stage precipitation process from iron(II) salt solutions, as described, for example, in DE 2618058 A1, example 1, or by the Laux process by reduction of nitrobenzene with metallic iron (Ullmanns Encyklopädie der technischen Chemie [Ullmann's Encyclopaedia of Industrial Chemistry], 4th Edition, Volume 18, page 603, Verlag Chemie, Weinheim 1979, and DE 518 929 C1). The aqueous treatment of pastes substantially comprising iron and oxygen and obtained from the wastewaters in the areas of washing, filtration, solid/liquid separation and also faulty batches, etc. (designated below as wastewater pastes), which treatment is described in DE 3 518 093 A1, also leads to iron oxide black pigments. The black pigments thus obtained generally have an undesired brownish shade.

The stabilization of pulverulent iron oxide black to oxidation can be effected by a chemical aftertreatment as described in DE 2 625 106 A1. This stabilizes the pigment, but the colour properties tended to be adversely affected and the ecology of the pigment was not positively influenced. A process, as described in DE 3 620 333 A1, for the thermal treatment of black pigments in a rotary kiln under inert conditions was therefore developed. A further improvement of this process, the heating being carried out not under inert conditions but under slightly oxidizing conditions, is described in DE 3 910 783 A1.

DE 3 620 333 A1 describes iron oxide black pigments which are prepared by the nitrobenzene reduction process and are subjected to a temperature treatment at 200 to 800° C. under a nonoxidizing atmosphere. Iron oxide black pigments having high colour strength can be obtained thereby. Furthermore, the colour quality improves in the desired manner by reduction in the brown shade and an increase in the blue tinge. The bluish shade, characterized by a negative low $b^*$ value, is of particular interest for users since it gives rise to the desired deep black colour impression. Black pigments having a positive high $b^*$ value have an undesired brownish appearance especially in full shade applications. The method for measuring the $b^*$ value is stated in the examples. In practice, however, it has been found that the process gives iron oxide black pigments which do not have completely satisfactory stability to oxidation. In other words, the storage of relatively large amounts of pigment at temperatures above 80° C. must be avoided since an oxidative change in the pigment may occur as a result of heat accumulation.

The pigments obtained by the one- or two-stage precipitation process from iron(II) salt solutions (cf. for example the pigments described in DE 2618058 A1, example 1) show the required stability to reduction in the colouring of plastics but are not sufficiently oxidation-stable for safe transport and with regard to handling. EP 096 885 A1 therefore proposed that iron oxide black pigments obtained by the nitrobenzene reduction process should be heated at temperatures of 400 to 800° C., preferably 600 to 700° C., in a weakly oxidizing atmosphere and optionally milled. The oxidizing atmosphere can most advantageously be adjusted with atmospheric oxygen to a level of 0.1 to 3% by volume, preferably 0.3 to 1.0% by volume, of oxygen.

Iron oxide black pigments having the desired colour properties and good stability to oxidation can be obtained from the processes described above.

In the colouring of thermoplastics, conventional iron oxide black pigments exhibit an undesired colour shift. This colour shift, which is characterized by the $\Delta E^*$ value, is caused by the reducing environment in the plastic melt; the iron oxide black pigments are not sufficiently stable to reduction. The method for measuring the $\Delta E^*$ value is stated in the examples.

It was therefore an object of the present invention to provide iron oxide black pigments having the required good stability to reduction, which simultaneously have the necessary stability to oxidation for transport and handling and the desired high colour strength and as blue-tinged a shade as possible.

SUMMARY OF THE INVENTION

This object was achieved in the form of an iron oxide black pigment
which has a colour shift $\Delta E^*$ according to DIN 53772 and DIN 6174 at 260° C. of <0.7, preferably of <0.5, on incorporation into HDPE, and
which is stable to oxidation at 140° C. according to the IMCO test, and
which has an extension ratio for the colour depth characteristic B 1/9 according to DIN 53235 Parts 1 and 2 of >1.9.

The method for measuring the colour shift $\Delta E^*$ in the case of incorporation into HDPE, the stability to oxidation according to the IMCO test and the extension ratio for the colour depth characteristic B 1/9 are stated in the examples.

DESCRIPTION OF DRAWINGS

FIG. 1 shows a circulating fluidized-bed for thermally frosting iron oxide black pigment precursors.

DETAILED DESCRIPTION OF THE INVENTION

The iron oxide black pigment usually has a colour shift $\Delta E^*$ according to DIN 53772 and DIN 6174 at 300° C. of <1.5, preferably of <1.2, on incorporation into HDPE.

The pigment usually has a $b^*$ value; measured in reduction in L64, of <−3.9, preferably of <−4.3. The method for measuring the $b^*$ value is stated in the examples.

The iron oxide black pigment usually has a specific surface area (BET) of 5 to 20 m$^2$/g, preferably of 7 to 15 m$^2$/g. The method for measuring the specific surface area (BET) is stated in the examples.

The iron oxide black pigment usually has a bulk density of 0.4 to 2.4 g/cm$^3$, preferably of 0.6 to 1.4 g/cm$^3$. The method for measuring the bulk density is stated in the examples.

The iron oxide black pigment usually has a tamped density of 0.5 to 3.0 g/cm$^3$, preferably of 0.8 to 1.6 g/cm$^3$. The method for measuring the tamped density is stated in the examples.

The iron oxide black pigment usually has a mean particle size based on a volume distribution of 1.0 to 4 µm, particularly of 2 to 3 µm. The method for measuring the mean particle size based on a volume distribution is stated in the examples.

The iron oxide black pigment usually has a mean particle size based on a surface distribution of 0.5 to 5.0 µm, particularly of 1.0 to 2.0 µm. The method for measuring the mean particle size based on a surface distribution is stated in the examples.

The iron oxide black pigment usually has an Fe(III)/Fe(II) ratio of 2.0 to 3.6, preferably of 2.4 to 3.0. The method for measuring the Fe(III)/Fe(II) ratio is stated in the examples.

The iron oxide black pigment usually has an oil number of 10 to 30 g of oil/100 g of iron oxide black pigment. The method for measuring the oil number is stated in the examples.

The iron oxide black pigment preferably has, measured in reduction in L64, a colour strength which is at least 15% higher than B Bayferrox® 318. The iron oxide black pigments have an extension ratio for the colour depth characteristic B 1/9 according to DIN 53235 Parts 1 and 2 of >1.9.

The invention also relates to a process for the preparation of iron oxide black pigment, characterized in that an iron oxide black pigment precursor is prepared, agglomerated and then thermally treated in a heated system.

The iron oxide black pigment precursor is preferably prepared by:
a) the reaction of iron salt solutions with alkaline compounds and oxidation (precipitation process),
b) oxidation of metallic iron with oxidation-containing compounds (Penniman process),
c) oxidation with nitrobenzene (nitrobenzene reduction process), or
d) isolation and working-up of byproducts or wastes (wastewater paste) substantially comprising iron/iron compounds and oxygen.

Examples of iron oxide black pigment precursors are all iron oxide or hydroxide modifications, such as, for example, goethite, haematite, magnetite, lepidocrocite and uncharacterizable iron hydroxide phases—for example from wastewater treatment—of various oxidation states and mixtures thereof.

The iron oxide black pigment precursor is preferably agglomerated to a mean particle size of 0.05 to 10 mm.

The agglomeration is preferably carried out using binders such as water-, P-, Si- or ligninsulphonate-containing binders or a combination of these binders.

The thermal treatment is preferably carried out at temperatures of 300 to 1000° C., in particular of 600 to 850° C.

The average residence time of the pigment in the heated system is preferably from 3 min to 60 min, in particular from 4 min to 40 min.

The thermal treatment is carried out as a function of the chemical composition and the physical properties of the iron oxide black pigment precursor, preferably in a slightly reduced, inert or slightly oxidizing atmosphere. The thermal treatment is preferably carried out under slightly oxidizing conditions. In the context of the present invention, slightly oxidizing conditions mean an oxygen content of 0.5-3.5%, preferably 1.5-2.5%, with a carbon monoxide content of 0.0-0.5%, preferably 0.1-0.3%, based on dry process gas.

The oxidation is preferably carried out using oxygen-containing gases as oxidizing agents.

The heated system preferably contains a first apparatus in which the precursor is fluidized by a gas mixture directed upwards from below so that a flow of a gas/solid mixture is formed and flows through the first apparatus from bottom to top and so that the gas and solid components are then separated from one another, optionally in a second downstream apparatus. By continuous monitoring of the process gas, it is ensured that the plant is switched off before an explosive gas mixture can form.

The amount of oxygen in the waste gas of the heated system is preferably between 0.0001 and 0.026 mol of oxygen per mole of iron passed through.

A part of the gas/solid mixture is preferably removed as iron oxide black pigment product at the bottom of the first apparatus. The gas/solid ratio in the first apparatus is preferably 100 to 1300 $m^3$(S.T.P.)/t of iron oxide black pigment.

The superficial gas velocity in the first apparatus is preferably between 0.5 and 6 m/s.

The first apparatus is preferably a circulating fluidized-bed reactor.

The downstream apparatus is preferably a cyclone. In the context of the invention, a cyclone is a device for separating off dust or liquid droplets with the aid of centrifugal or gravitational force (centrifugal separator). Cyclones consist in principle of a cylindrical vessel having a conically tapering bottom, into the top of which the entry pipe for dust-laden air projects tangentially and the exit pipe for clean air projects vertically. The tangentially entering gas/dust stream induces a fluidized flow, the coarser dust particles being accelerated to the wall of the cylinder by the centrifugal force and sinking to the bottom from there as a result of the gravitational force, from where they can be discharged. The circulating gas vortex freed of dust reverses its direction at the bottom of the cyclone and leaves the cyclone at the top through the exit pipe together with any finer particles, because the separation principle is not sufficient for eliminating fine dust impurities having particle sizes of <5 µm (Römpp Lexikon Chemie [Römpp Chemical Lexicon]—Version 2.0, Stuttgart/New York: Georg Thieme Verlag 1999).

It is advantageous to carry out the reaction with good gas/solid contact. This can be effected in a fluidized-bed reactor, a circulating fluidized bed, a rotary kiln, a rotary kiln having lifting blades or a fixed-bed reactor or in further units known to the person skilled in the art. The units used can be directly or indirectly heated with suitable fuel or electrically.

By suitable variation of the reaction conditions, in particular oxygen and carbon monoxide content, reaction temperature and residence time, the properties described in the claims can be established in a specific manner. Thus, the Fe(III)/Fe(II) ratio decreases as a result of a higher CO content in the gas atmosphere, and iron oxide black pigments having a greater blue tinge form. The BET surface area can be reduced by increasing the reaction temperature. Accordingly, the mean particle size increases.

In a preferred embodiment, the invention is carried out according to FIG. 1. The circulating fluidized-bed unit consists of
a core unit (I) containing a reactor (A), a preliminary separation cyclone (B1), a preheating stage (B2) where the starting material (1) is added and a recycle cyclone (B3),
a waste gas purification (II) containing a dust separator (C), a waste gas incinerator (D), a waste gas scrubber (F) and a chimney (G),
a process gas generator (III) containing a gas burner (H) in which, for example, natural gas (2) is burned,
and a discharge (IV) containing a product cooler (I) where the product (3) is discharged.

The unit is described in more detail below.

The reaction gas obtained by the combustion of, for example, natural gas (2) at a temperature of 880° C. in the reactor (A), for example a riser tube, having a diameter of 1.80 m and a height of 18 m, passes through the gas distributor. A temperature of 636° C. is established in the top of the reactor (A). The iron oxide microgranules present in the reactor (A) are accelerated by the process gas with a superficial velocity of 2.5 m/s and enter the preliminary separation cyclone (B1). The solid is separated from the hot gas in the preliminary separation cyclone (B1) and passes through flaps back into the reactor (A). The hot gas passes from the preliminary separation cyclone (B1) into the preheating stage (B2), while the pigment to be heated is added at 3.5 t/h. The solid is heated by the hot gas and then passes into the recycle cyclone (B3). In the recycle cyclone (B3), the solid is separated from the waste gas. The solid passes from the recycle cyclone (B3) back into the reactor (A). Solid is continuously discharged from the reactor (A), cooled to ambient temperature in a product cooler (I), such as, for example, a rotary tubular cooler, and then discharged (3) and temporarily stored in a bin.

The process gas is preferably generated by the combustion of natural gas with air, a part of the waste gas being fed from the recycle cyclone (B3), after dedusting in the dust separator (C) and preheating by heat exchangers in the waste gas combustion (D), back to the gas burner (H). The waste gas itself is scrubbed in the waste gas scrubber (F) and released through a chimney (G). By establishing a substoichiometric gas/air ratio at the gas burner, a carbon monoxide content of 0.30% by volume is established in the process gas. The oxygen content of 1.3% by volume required for the slightly oxidizing heating is established by an air lance in the riser tube.

The thermal treatment is preferably carried out in a gas atmosphere having the following composition:
steam content 30 to 50% by volume,
carbon dioxide content 2 to 10% by volume,
oxygen content 0 to 4% by volume,
carbon monoxide content 0.05 to 1% by volume.
The remaining proportions consist of the most part of nitrogen. Proportions of $SO_2$ and $NO_x$ may optionally also be present.

The reaction preferably takes place at a temperature between 300 and 1000° C. during a residence time of at least 4 minutes.

After the thermal treatment, the iron oxide black pigment can, for subsequent use, be subjected to milling, micronization, compaction, granulation or further conditioning steps known to the person skilled in the art.

Depending on the intended use, the pigment surface can be modified by an organic or inorganic aftertreatment.

The invention also relates to the use of the iron oxide pigments for colouring inorganic or organic dispersions, plastics or building materials. The use, for example in food colours, catalysts, wastewater treatment, toners and other applications for iron oxide black pigments known to the person skilled in the art, is in no way restricted by the treatment.

The iron oxide black pigments are suitable, for example, for colouring inorganic or organic dispersions and for colouring products of the paint and finish, coatings, building materials, plastics and paper industry, in foods and in products of the pharmaceutical industry, such as, for example, in tablets.

The invention is explained in more detail with reference to the following examples, without there being any intention to restrict the invention thereby.

EXAMPLES

I. Description of the Methods of Measurement Used

I.1. Measurement of the Colour Coordinates in L64thix, Reduction

The pigment was prepared using a muller in a nondrying test binder. The test binder ("L64 paste") consists of two components:

Component 1

SACOLYD® L640 (Krems Chemie AG, AU, alkyd resin binder based on linseed oil and phthalic anhydride) (formerly ALKYDAL® L64 (Bayer AG, Germany)). It corresponds to the specifications which are mentioned in the standards DIN EN ISO 787-24 (October 1995), ISO 787-25: 1993 and DIN 55983 (December 1983) as requirements for a test binder for coloured pigments.

Component 2

LUVOTHIX® HT (Lehmann & Voss & Co., Germany, pulverulent, modified, hydrogenated castor oil) as a rheological additive which is added to the paste to render it thixotropic. It was used in a concentration of 5.0% by weight, based on component 1.

The component 2 was dissolved in the component 1 at 75-95° C. The cooled, compact material was passed once over a three-roll mill. With this step, the L64 paste was complete. A plate-type colour grinding machine (muller), as described in DIN EN ISO 8780-5 (April 1995), was used. An ENGELSMANN JEL 25/53 muller having an effective plate diameter of 24 cm was used. The speed of the lower plate was about 75 $min^{-1}$. The force between the plates was set at about 0.5 kN by hanging a 2.5 kg loading weight on the loading bracket.

A commercial titanium dioxide pigment, TRONOX® R-KB-2, (Kerr-McGee Corp., US) (formerly BAYERTITAN® R-KB-2 (Bayer AG, Germany)), was used as a lightening agent. R-KB-2 corresponds in its composition to the type R 2 in ISO 591—1977. 0.4 g of pigment to be tested, 2.0 g of TRONOX® R-KB-2 and 3.0 g of L64 paste were dispersed in five stages of 25 revolutions each by the method described in DIN EN ISO 8780-5 (April 1995), Section 8.1.

The pigment/paste mixture was then introduced by spreading into a paste film holder which corresponds in its function to the paste film holder in DIN 55983 (December 1983). The doctor blade belonging to the paste film holder is drawn over the holder indentation filled with the pigment/paste mixture so that a smooth surface forms. The doctor blade is moved in one direction at a speed of about 3-7 cm/s. The smooth surface is measured within a few minutes.

Colorimeter

A spectrophotometer ("colorimeter") having the measuring geometry d/8 without a gloss trap was used. This measuring geometry is described in ISO 7724/2-1984 (E), Section 4.1.1, in DIN 5033 Part 7 (July 1983), Section 3.2.4 and in DIN 53236 (January 1983), Section 7.1.1.

A DATAFLASH® 2000 measuring device (Datacolor International Corp., USA) was used. The colorimeter was calibrated against a white, ceramic working standard, as described in ISO 7724/2-1984 (E), Section 8.3. The reflection data of the working standard against an ideally matt white body are deposited in the calorimeter so that, after calibration with the white working standard, all colour measurements are related to the ideally matt white body. The black point calibration was carried out using a black hollow body from the manufacturer of the colorimeter.

Colour Measurement

The result of the colour measurement is a reflection spectrum. For calculating the calorimetric coordinates, the illuminant with which the measurement was carried out is unimportant (except in the case of fluorescent samples). From the reflection spectrum, it is possible to calculate any desired colorimetric coordinate. The colorimetric coordinates used in this case are calculated according to DIN 6174 (CIELAB coordinates). Inter alia, the colour coordinate "b*" is calculated according to DIN 6174. The following is applicable for the colour impression: the more negative b* the greater is the blue tinge of the coloured pigment.

Any gloss trap present is switched off. The temperature of colorimeter and test specimen was about 25° C.±5° C.

I.2. Colour Strength

The colour coordinates are stated according to the above-described measurement according to DIN 6174 (CIELAB coordinates). The measurement in the reduction also results in the relative colour strength of the measured coloured pigment against a comparative pigment (in the given case: Bayferrox® 318, cf. table 1). In order to specify an absolute characteristic from these relative data, the so-called "extension ratio" was calculated. The extension ratio was determined according to DIN standard 53235 Part 1 and Part 2 from the year 1974 for the colour depth characteristic B 1/9. The ratio of a colour-imparting substance to a mixing component (in the given case: $TiO_2$); with which defined colour depth (depth of colouring) according to DIN standard 53235 Parts 1 and 2 from the year 1974 is achieved, is indicated by the extension ratio by way of illustration. A high extension ratio means that the same depth of colouring can be achieved with less pigment. Such a pigment therefore has a higher colour strength in practical use. An extension ratio for the colour depth characteristic B 1/9 according to DIN 53235 Parts 1 and 2 of more than 1.9 corresponds to a colour strength which is at least 15% higher than Bayferrox® 318.

I.3. Colour Shift/Stability to Reduction

The measurement of the colour shift in a reducing environment ("stability to reduction") is effected in HDPE according to DIN 53772 of September 1981 by 1% pigmenting in HDPE, the colour shift of the test specimens on increasing the incorporation temperature in comparison with the lowest possible test temperature of 200° C. being determined. $\Delta E^*$ is determined for the samples which were prepared at 300° C., 260° C. and 200° C. (200° C.=lowest possible test temperature=reference) incorporation temperature in HDPE, according to DIN 6174 of January 1979.

"HDPE" is an abbreviation (derived according to DIN 7728, Part 1, January/1988, from the English designation "high density polyethylene") for polyethylene of high density produced under low pressure. Instead of the abbreviation HDPE, the abbreviation PE-HD is increasingly used today. In addition to the conventional HDPE having molar masses of less than 300 000 g/mol, higher molecular weight high density polyethylenes which are designated as "high molecular weight" HMW-HDPE ($4 \cdot 10^4 < M_R < 3 \cdot 10^5$), "extra high molecular weight" ($5 \cdot 10^5 < M_R < 1 \cdot 10^6$) and "ultra-high molecular weight" UHMW-PE ($M_R > 3.1 \cdot 10^6$) (Römpp Lexikon Chemie [Römpp Chemical Lexicon]—Version 2.0, Stuttgart/New York: Georg Thieme Verlag 1999) are commercially available for special purposes.

Stability to reduction in the context of the application means that the colour shift $\Delta E^*$ of the HDPE test specimens on increasing the incorporation temperature from 200° C. to 300° C. is not more than 0.7 units.

I.4. Stability to Oxidation

Stability to oxidation in the context of the application means that the product must have a temperature stability of at least 140° C. in the IMCO test. The Intergovernmental Maritime Consultative Organization, also referred to as IMCO and renamed as International Maritime Organization ("IMO") from 1982, is an international maritime organization which was set up in 1948 with the aim of facilitating the technical cooperation in matters relating to ships between governments, mainly for ensuring safer and more efficient navigation and control of pollution of the seas by ships.

For testing the stability to oxidation according to the so-called IMCO test, 1 l of product is introduced into an air-permeable wire net cube of phosphor bronze gauze having 18 000 mesh per $cm^2$ (350×350 mesh) and 10 cm side length; the cube is placed in the centre of a laboratory oven with internal air circulation, heated to the test temperature of 140° C. and kept at this temperature for 24 h. If a temperature of more than 200° C. occurs in the interior of the sample, the sample is not stable according to the IMCO test.

A laboratory oven having an internal air circulation and the possibility of control for reaching interior temperatures of 140° C.+/−2° C. is used. A suitable system for measuring and entering the temperature in the oven and at the midpoint of the cube is used for the temperature measurement. A chromium-aluminium thermocouple pair of 0.27 mm diameter wire was used.

I.5. BET Surface Area

The determination of the BET surface area was effected via the carrier gas process ($He:N_2=90:10$) according to the one-point method, according to DIN 66131 (1993). Before the measurement, the sample is heated for 1 h at 140° C. in a dry nitrogen stream. The measurement temperature is 77 K.

I.6. Bulk Density

The bulk density is determined for the finished material without further treatment of the product from the ratio of mass to volume.

I.7. Tamped Density

The tamped density is determined by ISO 787 Part 11 (1995).

I.8. Mean Particle Size Distribution

Both the mean particle size based on a volume distribution (D [4.3]) and the mean particle size based on a surface distribution (D [3.2]) are determined by laser diffraction (apparatus from Malvern Instruments "Mastersizer-S") in an aqueous suspension with 0.1% of sodium phosphate as a dispersant after ultrasonic dispersion for two minutes at 200 W.

"D [4.3]" is the mean value of the particle size based on the volume distribution ("Herdan diameter").

"D [3.2]" is the mean value of the particle size based on the surface distribution ("Sauter diameter").

I.9. Fe(III)/Fe(II) Ratio

The Fe(III)/Fe(II) ratio is determined by potentiometric titration after acidic digestion of the samples.

I.10. Oil Number

"Oil number" is understood as meaning the amount of varnish linseed oil which is absorbed under specified conditions by a pigment or filler sample. The oil number is a customary characteristic for characterizing the oil requirement of pigments and fillers and is stated in the unit mg/100 g or g/100 g. The oil number is determined according to ISO 787 Part 5 (1983).

II. Example 1

25 m³ of a paste substantially comprising iron and oxygen and obtained from wastewaters in the areas of washing, filtration, solid/liquid separation and also faulty batches (designated below as wastewater pastes) and having a density of 1.25 g/cm³ and 10 m³ of a wastewater paste having a density of 1.4 g/cm³ were initially introduced into a stirred container, and 4000 l of 32% strength sodium hydroxide solution were added. By blowing in direct steam, the reaction mixture was heated to 90° C. After addition of 20 m³ of iron sulphate sludge, which is obtained in the clarification of iron sulphate solution in other production areas, stirring was effected for 90 min, the batch being gassed with 100 m³/h of air. After addition of a further 250 l of sodium hydroxide solution, stirring was effected again for 90 min. 20 t of an iron oxide black pigment were obtained; After dilution with water to a density of 1.1 g/cm³, coarse fractions were removed in a hydrocyclone unit.

After thickening by sedimentation and filtration by means of a vacuum drum filter, the paste was dried by means of a disc spray dryer at a heating gas inlet temperature of 600° C. to a residual moisture content of 2%.

The microgranules thus obtained, having a mean particle size of 100 μm, were heated in a circulating fluidized bed. However, the following process parameters were established.

Superficial velocity: 2.5 m/s
Temperature of the process gas: 880° C.
Temperature in the top of the riser tube: 636° C.
Product feed: 3.5 t/h
CO content in the process gas: 0.30% by volume
$O_2$ content in the process gas: 1.3% by volume.

15 l of 1,2-propylene glycol were added in a ribbon mixer to 10 t of the black pigment thus prepared and the mixture was milled by means of a pendulum roller mill to a sieve residue of <0.05% at 45 μm mesh size. The data of the resulting black pigment according to the invention are listed in tables 1 and 2.

III. Example 2

25 m³ of a paste substantially comprising iron and oxygen and obtained from wastewaters in the areas of washing, filtration, solid/liquid separation and also faulty batches (designated below as wastewater pastes) and having a density of 1.33 g/cm³ and 30 m³ of a wastewater paste having a density of 1.2 g/cm³ were initially introduced into a stirred container, and 4500 l of 32% strength sodium hydroxide solution were added. By blowing in direct steam, the reaction mixture was heated to 90° C. After addition of 20 m³ of iron sulphate sludge, which is obtained in the clarification of iron sulphate solution in other production areas, stirring was effected for 90 min, the batch being gassed with 100 m³/h of air. Stirring was then effected for a further 90 min. 27 t of an iron oxide black pigment are obtained. After dilution with water to a density of 1.03 g/cm³, coarse fractions were removed in a hydrocyclone unit.

After thickening by sedimentation and filtration by means of a vacuum drum filter, the paste was dried by means of a disc spray dryer at a heating gas inlet temperature of 475° C. to a residual moisture content of 2.5%.

The resulting microgranules having a mean particle size of 100 μm were heated in the circulating fluidized bed described in example 1. However, the following process parameters were established:

Superficial velocity: 2.2 m/s
Temperature of the process gas: 900° C.
Temperature in the top of the riser tube: 698° C.
Product feed: 3.4 t/h
CO content in the process gas: 0.12% by volume
$O_2$ content in the process gas: 1.8% by volume.

15 l of 1,2-propylene glycol were added in a ribbon mixer to 10 t of the black pigment thus prepared and the mixture was milled by means of a pendulum roller mill to a sieve residue of <0.003% at 45 μm mesh size. The data of the resulting black pigment according to the invention are listed in tables 1 and 2;

Comparative Examples

The comparative pigment is commercially available Bayferrox® 318, Bayferrox® 318M and Bayferrox® 306 from Lanxess Deutschland GmbH, and two further comparative examples. The first was prepared according to EP 187434, example 1, and the second is a customary precipitated black pigment which has been prepared by a precipitation process. Such pigments can be prepared, for example, according to DE 2618058 A1, example 5.

TABLE 1

| | ΔE* at 260° C. in HDPE | ΔE* at 300° C. in HDPE | b* (blue tinge) Reduction in L64 | Colour strength Reduction in L64 against Bayferrox® 318 | Extension ratio for colour depth characteristic B 1/9 | IMCO stability at 140° C. |
|---|---|---|---|---|---|---|
| Example 1 | 0.5 | 1.2 | −4.5 | 118% | 2.23 | Yes |
| Example 2 | 0.5 | 1.1 | −4.0 | 130% | 2.43 | Yes |
| Bayferrox ® 318 | 1.1 | 2.7 | −3.7 | 100% | 1.88 | Yes |
| Bayferrox ® 318 M | 1.4 | 3.2 | −2.6 | 134% | 2.53 | Yes |
| Bayferrox ® 306 | 0.6 | 1.4 | −4.8 | 90% | 1.70 | Yes |
| EP 187434 Example 1 | 0.5 | 0.9 | −4.6 | 220% | 4.16 | No |
| DE 2618058 A1 Example 5 | 0.2 | 0.6 | −6.1 | 110% | 2.08 | No |

 = Property does not meet the requirements.

TABLE 2

| | Fe(III)/Fe(II) | BET m²/g | Tamped density g/cm³ | Bulk density g/cm³ | Oil number g/100 g |
|---|---|---|---|---|---|
| Example 1 | 2.77 | 9.7 | 1.03 | 0.70 | 19.0 |
| Example 2 | 2.83 | 9.6 | 1.05 | 0.64 | 19.2 |
| Bayferrox ® 318 | 3.51 | 10.2 | 1.23 | 0.75 | 19 |
| Bayferrox ® 306 | 3.20 | 12.6 | 1.43 | 0.9 | 20 |
| Bayferrox ® 318 M | 3.30 | 10.7 | 1.4 | 0.9 | 18 |
| EP 187434 Example 1 | 2.38 | 7.9 | 1.51 | 0.94 | 16 |
| DE 2618058 A1 Example 5 | 2.36 | 4.2 | 0.75 | 0.37 | 25.6 |

What is claimed is:

1. An iron oxide black pigment having a color shift $\Delta E^*$ according to DIN 53772 and DIN 6174 at 260° C. of <0.7 on incorporation into HDPE, and oxidation stability at 140° C. according to an IMCO test, and an extension ratio for a color depth characteristic B 1/9 according to DIN 53235 Parts 1 and 2 of >1.9, and a b* value according to DIN 6174, measured in reduction in L64, of <−3.9.

2. The iron oxide black pigment according to claim 1, wherein the iron oxide black pigment has a color shift $\Delta E^*$ according to DIN 53772 and DIN 6174 at 300° C. of <1.5 on incorporation into HDPE.

3. The iron oxide black pigment according to claim 1, wherein the iron oxide black pigment has a color shift $\Delta E^*$ according to DIN 53772 and DIN 6174 at 300° C. of <1.2 on incorporation into HDPE.

4. The iron oxide black pigment of claim 1, wherein the iron oxide black pigment has a color shift $\Delta E^*$ according to DIN 53772 and DIN 6174 at 260° C. of <0.5 on incorporation into HDPE.

5. The iron oxide black pigment according to claim 1, wherein the iron oxide black pigment has a b* value according to DIN 6174, measured in reduction of L64, of <−4.3.

6. A process for the preparation of an iron oxide black pigment according to claim 1, comprising:
preparing an iron oxide
agglomerating the iron oxide to make an iron oxide black pigment precursor, and then thermally treating the iron oxide black pigment precursor in a heated system.

7. The process for the preparation of iron oxide black pigment according to claim 6, wherein the thermal treatment is carried out at a temperature of 300° C. to 1000° C. with an average residence time of the iron oxide black pigment precursor in the heated system of from 3 min to 60 min.

8. The process for the preparation of iron oxide black pigment according to claim 7, wherein the average residence time of the pigment in the heated system is from 3 min to 40 min.

9. The process for the preparation of iron oxide black pigment according to claim 6, wherein the heated system used is a circulating fluidized bed.

10. A process for coloring inorganic or organic dispersions, products of the paint and finish, coatings, building materials, plastics and/or paper industry, foods and products of the pharmaceutical industry comprising mixing the iron oxide black pigment according to claim 1 with the respective inorganic or organic dispersions, products of the paint and finish, coatings, building materials, plastics and paper industry, foods and/or products of the pharmaceutical industry.

* * * * *